US010464729B2

(12) United States Patent
Hernandez et al.

(10) Patent No.: US 10,464,729 B2
(45) Date of Patent: Nov. 5, 2019

(54) PACKAGE WITH PEELABLE AND NON-PEELABLE HEAT SEALS

(71) Applicant: Dow Global Technologies LLC, Midland, MI (US)

(72) Inventors: Claudia Hernandez, Freeport, TX (US); Mustafa Bilgen, Freeport, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/781,854

(22) PCT Filed: Dec. 12, 2016

(86) PCT No.: PCT/US2016/066084
§ 371 (c)(1),
(2) Date: Jun. 6, 2018

(87) PCT Pub. No.: WO2017/106075
PCT Pub. Date: Jun. 22, 2017

(65) Prior Publication Data

US 2018/0354696 A1 Dec. 13, 2018

Related U.S. Application Data

(60) Provisional application No. 62/268,033, filed on Dec. 16, 2015.

(51) Int. Cl.
*B65D 75/58* (2006.01)
*B32B 7/12* (2006.01)
(Continued)

(52) U.S. Cl.
CPC ............ *B65D 75/5855* (2013.01); *B32B 3/04* (2013.01); *B32B 7/12* (2013.01); *B32B 15/10* (2013.01);
(Continued)

(58) Field of Classification Search
CPC .. B65D 75/5855; B65D 31/005; B65D 31/02; B65D 33/1658; B32B 7/12; B32B 15/10; B32B 27/08; B32B 27/308; B32B 27/32; B32B 3/04; B32B 2250/246; B32B 2255/10; B32B 2255/205; B32B 2270/00;
(Continued)

(56) References Cited

U.S. PATENT DOCUMENTS 4,339,507 A 7/1982 Kurtz et al.
6,525,157 B2 2/2003 Cozewith et al.
(Continued)

*Primary Examiner* — Michael C Miggins
(74) *Attorney, Agent, or Firm* — Husch Blackwell LLP

(57) ABSTRACT

A package, e.g., a pouch, comprising: (A) An exterior surface comprising oriented-polypropylene (OPP), and (B) An interior surface comprising a blend, in weight percent based on the weight of the blend, of: (1) From 30 to 80 wt % of a propylene-based plastomer or elastomer (PBPE), and (2) From 20 to 70 wt % of low density polyethylene (LDPE); the package further comprising (C) A peelable end seal formed by joining in a heat seal two sections of the interior surface, the heat seal having a seal strength of 1 to 4 pounds per inch (lb/in) (4.48 to 17.9 Newton (N)/25.4 millimeter (mm)), and (D) A lap seal formed by joining in a heat seal a section of the interior surface with a section of the exterior surface, the heat seal having a seal strength of greater than or equal to (≥) 15 lb/in (67.2 N/25.4 mm).

20 Claims, 3 Drawing Sheets

FIN SEAL

BAG BACK LEFT PANEL
BAG FRONT PANEL
BAG BACK RIGHT PANEL
BACK LEFT PANEL FOLDS AROUND
BACK RIGHT PANEL FOLDS AROUND
FIN SEAL PACKAGING → BAG BEING FORMED → FINAL FIN SEAL

(51) Int. Cl.

| | |
|---|---|
| ***B32B 15/10*** | (2006.01) |
| ***B32B 27/08*** | (2006.01) |
| ***B32B 27/30*** | (2006.01) |
| ***B32B 27/32*** | (2006.01) |
| ***B32B 3/04*** | (2006.01) |
| ***B65D 30/00*** | (2006.01) |
| ***B65D 30/08*** | (2006.01) |
| ***B65D 33/16*** | (2006.01) |

(52) U.S. Cl.

CPC ........... *B32B 27/08* (2013.01); *B32B 27/308* (2013.01); *B32B 27/32* (2013.01); *B65D 31/005* (2013.01); *B65D 31/02* (2013.01); *B65D 33/1658* (2013.01); *B32B 2250/246* (2013.01); *B32B 2255/10* (2013.01); *B32B 2255/205* (2013.01); *B32B 2255/26* (2013.01); *B32B 2270/00* (2013.01); *B32B 2307/31* (2013.01); *B32B 2307/4023* (2013.01); *B32B 2307/412* (2013.01); *B32B 2307/514* (2013.01); *B32B 2307/7242* (2013.01); *B32B 2307/7265* (2013.01); *B32B 2307/748* (2013.01); *B32B 2439/06* (2013.01); *B32B 2439/70* (2013.01)

(58) Field of Classification Search

CPC ........ B32B 2307/31; B32B 2307/4023; B32B 2307/412; B32B 2307/514; B32B 2307/7242; B32B 2307/7265; B32B 2307/748; B32B 2439/06; B32B 2439/70; B32B 2255/26

See application file for complete search history.

(56) References Cited

U.S. PATENT DOCUMENTS

| | | | |
|---|---|---|---|
| 6,960,635 | B2 | 11/2005 | Stevens et al. |
| 2002/0168512 | A1 | 11/2002 | Eggers et al. |
| 2005/0266257 | A1 | 12/2005 | Lee et al. |
| 2009/0087648 | A1 | 4/2009 | Lee |
| 2010/0239796 | A1 | 9/2010 | Gagne et al. |
| 2011/0253296 | A1 | 10/2011 | Lee et al. |
| 2014/0065382 | A1 | 3/2014 | Koehn et al. |
| 2015/0328865 | A1 | 11/2015 | Hernandez et al. |
| 2016/0039178 | A1 | 2/2016 | Benason et al. |

819544 = INVENTIVE EXAMPLE / SEALANT TO SEALANT - SHEAR PULL "T-PEEL"
819545 = COMPARATIVE EXAMPLE / SEALANT TO SEALANT - SHEAR PULL "T-PEEL"

PACKAGE WITH PEELABLE AND NON-PEELABLE HEAT SEALS

FIELD OF THE INVENTION

This invention relates to packaging. In one aspect, the invention relates to a package, e.g., a pouch, with heat seals while in another aspect, the invention relates to a package with both peelable and non-peelable heat seals.

BACKGROUND OF THE INVENTION

Heat sealable and peelable films are generally made from one or more polymeric resins. The resulting characteristics of a heat sealable and peelable film depend largely upon the type of resins used to form the film. For example, ethylene vinyl acetate (EVA) and ethylene methyl acrylate (EMA) copolymers provide excellent heat sealing properties. However, the seals produced with these copolymers are such that separation usually cannot be achieved without damage to the film, i.e., the seal is a "hard seal". To alleviate this problem, polybutylene is mixed with an EVA polymer to produce a heat sealable and peelable film, i.e., the seal is a "frangible seal". Although the peelability of the film is improved, this blend lacks good hot tack strength and the peelable film has some unpleasant odor due to the presence of EVA. In addition to using polybutylene, some ionomers, such as SURLYN® ionomer resin (a copolymer of ethylene and methacrylic acid), is mixed with EVA to produce a heat sealable and peelable film. While the film is peelable, it causes stringiness or "angel hair" upon separation of the film. Moreover, ionomers are generally expensive and may have some odor as well.

Oriented polypropylene (OPP) laminates are commonly used for packaging, e.g., forming pouches by fin- or lap-seals (to form the tube of the pouch) and end-seals (to close the pouch on both ends). Lap seals are formed by overlapping the inside (interior) layer (i.e., the sealant layer) of the structure and the outside (exterior) surface of the structure and heat sealing them. Fin seals are formed when the inside (sealant) surfaces of the structure meet and seal against themselves, typically in the back center of the bag. Lap seals provide material saving, compared to fin seals, because of not having to create folds.

Strong sealants to polypropylene (PP)-based films such as elastomers and plastomers provide high hermetic seals but lack peel seal attributes.

WO 2014/100386 teaches a combination of peel-seal (frangible seal) and lock-up seal (hard seal) of propylene-based plastomers or elastomer (PBPE) resin in a multi compartment pouch format but in all cases by sealing two sealant layer surfaces. It does teach packaging formats with fin seals.

Of continuing interest to the packaging industry is a package with both a peelable end seal (for consumer convenience) and a non-peelable lap seal (for hermetic sealing during handling and transportation). Such a package is a challenge for the typical sealants used in oriented PP-based laminates. Such sealants, e.g., PBPE, in a pouch format generally provide non-peelable seals for the end-seals and the lap-seals.

SUMMARY OF THE INVENTION

In one embodiment the invention is a package comprising:

(A) An exterior surface comprising oriented-polypropylene (OPP), and (B) An interior surface comprising a blend, in weight percent based on the weight of the blend, of:

(1) From 30 to 80 wt % of a propylene-based plastomer or elastomer (PBPE), and (2) From 20 to 70 wt % of low density polyethylene (LDPE);

the package further comprising:

(C) A peelable end seal formed by joining in a heat seal two sections of the interior surface, the heat seal having a seal strength of 1 to 4 pounds per inch (1b/in) (4.48 to 17.9 Newton (N)/25.4 millimeter (mm)), and (D) A lap seal formed by joining in a heat seal a section of the interior surface with a section of the exterior surface, the heat seal having a seal strength of greater than or equal to (≥) 15 lb/in (67.2 N/25.4 mm).

In one embodiment the package is a pouch.

DETAILED DESCRIPTION OF THE PREFERRED EMBODIMENT

Definitions

Figures 1, 2:
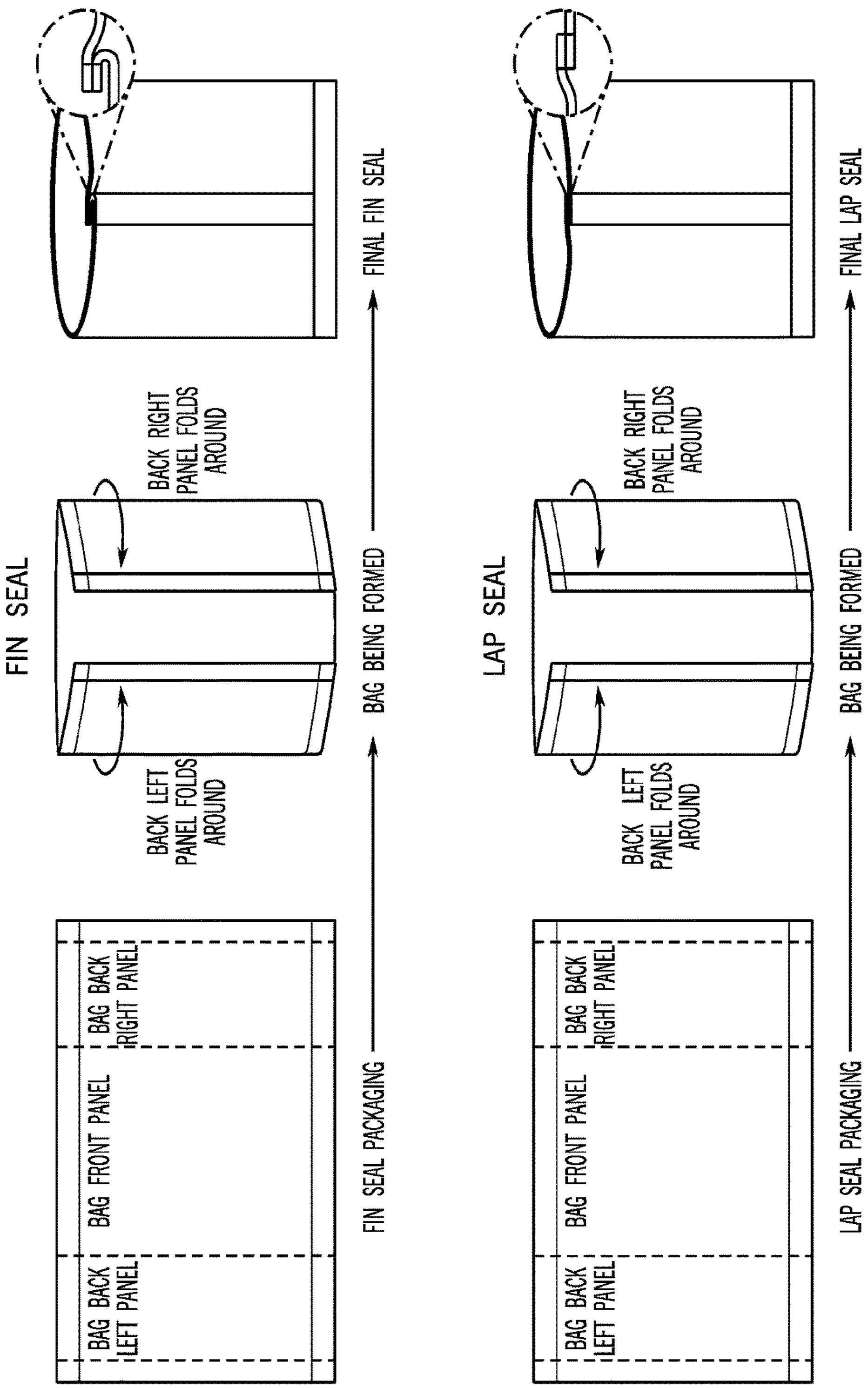
FIG. 1 is a sequence of three drawings illustrating the formation of a fin seal.
FIG. 2 is a sequence of three drawings illustrating the formation of a lap seal.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

The numerical ranges of this disclosure include all values from, and including, the lower and/or upper values. For ranges containing explicit values (e.g., 1 to 10; or 3 to 5, or 6, etc.), any subrange between any two explicit values is included (e.g., 1 to 2; 2 to 6, 5 to 7, 3 to 7, 5 to 6, etc.; or 3 to 4.5, or 5.5, etc.).

The terms "comprising", "including", "having", and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

The term "or," unless stated otherwise, refers to the listed members individually as well as in any combination.

Use of the singular includes use of the plural and vice versa

"Heat sealable film structure" and like terms mean a film structure that forms a heat seal when subjected to a heat sealing procedure. A heat sealing procedure includes hot metal sealing jaws that are moved from an open position to a closed position. In the closed position, the hot metal jaws come into direct contact with the outermost layers of a film for a period of time (dwell time), a predetermined sealing pressure, and a predetermined sealing temperature. During the dwell time, heat is transferred through the outermost layer of the film to melt and fuse opposing inner seal layers to form a heat seal. Generally, the outermost layer has a higher melting temperature than the seal layer. As such, while the seal layer is melted to form a seal, the outermost layer of the film does not melt and does not stick, or does not substantially stick, to the sealing jaws. Surface treatments to the sealing jaw bars may be applied to further reduce stickiness effects to the films. After the sealing jaws reopen, the film is cooled to room temperature. The heat sealing procedure can be used to form the film into a desired shape—such as a bag, a pouch, a sachet, and a stand up pouch, for example.

In an embodiment, the hot metal jaws are a component of a form, fill, and seal device.

The heat seal can be a frangible seal or a hard seal. A "frangible seal" is a heat seal that is manually separable (or peelable) without destruction of the film. A "hard seal" is a heat seal that is not manually separable without destruction of the film. In general, a frangible seal is designed to be separable or openable with application of finger pressure or hand pressure to the seal. A hard seal is designed to remain intact with application of finger pressure or hand pressure to the seal. Heat seal strength is measured in accordance with ASTM F88-94.

"Hot tack strength" and like terms mean the strength of heat seals formed between thermoplastic surfaces of flexible webs, immediately after a seal has been made and before it cools to ambient temperature. In form-fill operations, sealed areas of packages are frequently subject to disruptive forces while still hot. If the hot seals have inadequate resistance to these forces, breakage can occur during the packaging process. Hot tack strength, also known as hot seal strength, is a measure to characterize and rank materials in their ability to perform in commercial applications where this quality is critical. Hot tack strength can be measured in accordance with ASTM F1921/F1921M-12e1.

"Pouch", "packaging pouch" and like terms mean a sealed plastic container. Pouches are typically very flexible but some are designed to be free-standing when filled. Pouches are typically formed from a plastic laminate film, and are tubular in general shape. The longitudinal or elongated side of the tube is formed by bending the film along its longitudinal axis onto itself and joining its longitudinal edges into a fin or lap seal. The tube is typically "closed" by forming two end seals along its cross or transverse axis. Pouches are used for packaging a wide variety of goods, typically liquids and free-flowing solids, including, but not limited to, food, drink, medical supplies, industrial commodities, etc.

"Propylene-based plastomer" and like terms mean a polymer comprising at least 50 weight percent (wt %) mer units derived from propylene and having a density from 0.8801 to 0.9000 g/cm$^3$. Typically, the remaining mer units of the polymer comprise ethylene and/or a $C_{4-12}$ alpha-olefin such as 1-butene, 1-hexene, 1-octene, etc.

"Propylene-based elastomer" and like terms mean a polymer comprising at least 50 wt % mer units derived from propylene and having a density from 0.8601 to 0.8800 g/cm$^3$. Typically, the remaining mer units of the polymer comprise ethylene and/or a $C_{4-12}$ alpha-olefin such as 1-butene, 1-hexene, 1-octene, etc.

"Mer", "mer unit" and like terms means a repeating unit of a polymer typically derived from the monomer or monomers from which the polymer is made. The mer unit for polyethylene is $—CH_2—CH_2—$ which is derived from ethylene ($CH_2═CH_2$), and the mer unit for polypropylene is $—CH_2—CH_2—(CH_3)$ which is derived from propylene ($CH_2═CH—CH_3$).

Heat Seals

Fin and Lap Seals

Heat sealable and peelable films (also known as "peelable seals") are employed on a large scale, for temporarily closing containers that include, for example, food products or medical devices. During use, a consumer tears away the peelable film. Peelability generally refers to the ability to separate two materials or substrates in the course of opening a package without compromising the integrity of either of the two. To gain consumer acceptance, a number of characteristics associated with a heat sealable and peelable film are desired. For example, in addition to the "peelable" characteristic, the film should also provide a leak-proof closure of the container or bag.

To seal a package, heat sealing is commonly used. A typical pouch or bag formed in an automatic packaging line has a top seal, a bottom seal and a back seal. Typically, the seal used to form the tube of the pouch (typically at the back center of the pouch), is a fin seal or lap seal.

As shown in FIG. 1, the fin seal is formed when the inside surface of the film meets and seal against itself, typically in the back center of the bag. The fin seal (sealant-to-sealant) has the advantage of achieving a higher seal strength (when the composition (e.g., OPP) of the exterior surface does not have intrinsic sealing properties), but it requires a higher (approximately 4% more area per unit) packaging area, relative to a lap seal, and thus, is more expensive.

As shown in FIG. 2, a lap seal is formed when the interior surface of the film seals to the opposite or exterior surface of the film, again typically in the back center of the bag. The lap seal (sealant-to-skin) has the advantage of having less packaging area than a fin seal, but the seal strength is poor relative to the fin seal.

End Seals

End seals are formed when two sections, typically end sections, of the inside surface of the film meet and seal against one another. End seals are located at the top and bottom ends of a package, e.g., pouch, and they are typically perpendicular to the fin or lap seal.

Measurement

Figure 3:
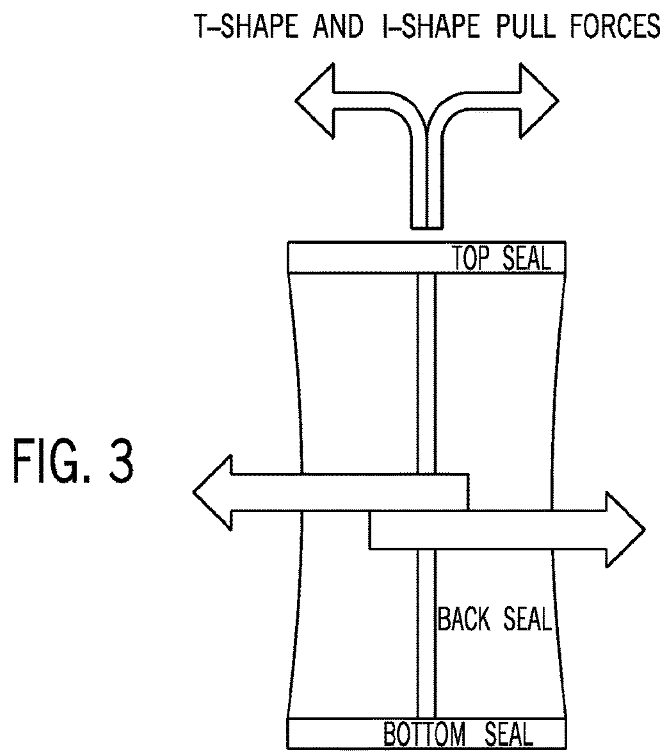
FIG. 3 is a drawing illustrating T-shape and I-shape pull forces.

The force required to pull a seal apart is called "seal strength" (also known as "heat seal strength"). For purposes of this disclosure, seal strength is measured in accordance with ASTM F88-94. Unlike the measurement of hot tack strength, the seal strength is measured at ambient conditions. FIG. 3 illustrates the typical forces a pouch with an end-seal and a lap-seal experiences when handled by a consumer. The seal strength for the end (here "top") seal of the pouch is measured with a T-shape pull force (by pulling both ends of the top of the package at a 90° angle), which mimics what a consumer exerts to open a package with his/her hands.

The seal strength for the lap (here "back") seal is measured with an I-shape pull force (by pulling both sides of the package at a 180° angle), which mimics what a package experiences during its handling and transportation.

As such, the desired seal strength of the seals varies according to specific end user applications and the design of the package. The T-peel seal strength is commonly specified according to individual manufacturer requirements. For flexible packaging applications, such as cereal liners, snack food packages, cracker tubes and cake mix liners, the T-shape seal strength desired is generally in the range of 1-4 lb/in (4.48-17.9 N/25.4 mm), or 1-3 lb/in (4.48-13.4 N/25.4 mm), or 1-1.5 lb/in (4.48-6.7 N/25.4 mm). The I-peel heat seal testing simulates real-world lap seal forces to separate the lap seal. Strong seals are typically desired to warranty a hermetic seal of the package. Such seals are known as, among other names, lock-up seals. These seals generally have an I-shape seal strength of at least 5 lb/in (22.4 N/25.4 mm), or 10 lb/in (44.8 N/25.4 mm), or 15 lb/in (67.2 N/25.4 mm).

Package

The package of this invention can vary widely in size, shape, composition and construction. Various constructions include, but are not limited to, pouches (including free standing pouches) and sachets. In one embodiment, the package is a pouch constructed from a laminated film. The laminated film comprises at least an exterior surface (also known as a lamination substrate, and it is generally based on oriented materials such as oriented polypropylene or, in some cases, oriented or non-oriented polyethylene substrates can be used), and an interior surface (also known as a sealant film which generally contains a heat sealable layer. This could be a mono or coextruded structure based on materials including, but not limited to polyethylene, polypropylene, polyamide, polyester or copolymers of these). The laminated film comprises at least two layers, each layer a film or coating. The laminated film can comprise one or more intermediate layers, i.e., a layer between the exterior and interior layers, which can be either a film or coating (the latter of which is generally a type of liquid adhesive or a molten polymer, e.g., polyethylene, which binds the exterior and the interior layers). Each layer, i.e., exterior, intermediate and interior, can comprise two or more sublayers.

Exterior Layer

The exterior layer of the package comprises OPP which includes mono-oriented cast polypropylene (cPP) and bi-oriented polypropylene (BOPP). Either one can be transparent, reverse or direct printed, coated, pigmented and/or metallized film. Typically, the exterior layer comprises a single sheet of OPP film, i.e., the single sheet does not comprise any sublayers. As such, both surfaces of the exterior layer comprise, or consist essentially of, or consist of, OPP. The OPP used in the practice of this invention are known materials and commercially available.

Interior Layer

The interior layer of the package comprises a blend, in weight percent based on the weight of the blend, of (1) at least 50%, or 60%, or 70%, or 80%, or 90% of a propylene-based plastomer or elastomer (PBPE), and (2) less than 50%, or 40%, or 30%, or 20%, or 10% of low density polyethylene (LDPE) as one of its surfaces, i.e., at least the surface that is open to the interior of the package and is not in contact with either one of the surfaces of the exterior layer (other than as part of a heat seal) or one of the surfaces of an intermediate layer. In one embodiment the interior layer comprises a single sheet of film comprising, or consisting essentially of, or consisting of, a blend comprising at least 70 weight percent (wt %) PBPE and not in excess of 30 wt % LDPE. The blend can comprise one or more additives including, but not limited to, slip agents, anti-block agents, antioxidants, etc. If present, these additives are used in known amounts, e.g., in the aggregate usually less than 10 wt %, or 5 wt %, or 3 wt %, or 2 wt % based on the total weight of the blend, i.e., PBPE, LDPE and additives.

In one embodiment the interior layer comprises two or more sublayers of which one sublayer (i.e., the sublayer with a surface open to the interior of the package) comprising, or consisting essentially of, or consisting of, the PBPE/LDPE blend, and each of the other layers, none of which having a surface open to the interior of the package, comprising a polymeric material other than the PBPE/LDPE blend. Such other polymeric materials include, but are not limited to, polyolefins (preferred), polycarbonates, polyesters, polyethers, polyamides and the like. Typically, each sublayer is a film, and the interior layer itself is a co-extruded film with each sublayer joined and in contact with the sublayer to which it is adjacent.

In one embodiment the interior layer is a co-extruded film comprising three sublayers, a first sublayer comprising, or consisting essentially of, or consisting of a PBPE (e.g., VERSIFY™ 2000), a second sublayer comprising, or consisting essentially of, or consisting of a polyolefin (preferably a polyethylene, and more preferably a low density polyethylene (LDPE)), and a third sublayer comprising, or consisting essentially of, or consisting of, the PBPE/LDPE blend. The sublayers are arranged so that one surface (the bottom surface) of the first sublayer is in contact with one surface (the top surface) of the second sublayer, and the other surface of the second sublayer (the bottom surface) is in contact with one surface (the top surface) of the third sublayer. The top surface of the first sublayer is thus available to join with either all or part of the bottom surface of the exterior layer or the bottom surface of an intermediate layer. The bottom surface of the third sublayer is thus available to join with a part of the top surface of the exterior layer in a heat seal while the remainder of the bottom surface of the third sublayer is available to serve as the interior surface of the package.

PBPE

In one embodiment the PBPE is characterized as having substantially isotactic propylene sequences. "Substantially isotactic propylene sequences" means the sequences have an isotactic triad (mm) measured by 13C NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by 13C NMR spectra.

The PBPE has a melt flow rate (MFR) in the range of from 0.1 to 25 g/10 minutes (min.), measured in accordance with ASTM D-1238 (at 230° C./2.16 kg). For example, the MFR can be from a lower limit of 0.1, 0.2, or 0.5, to an upper limit of 25, 15, 10, 8, or 5, g/10 min. For example, when the PBPE is propylene/ethylene copolymer, it may have a MFR in the range of 0.1 to 10, or in the alternative, 0.2 to 10, g/10 min.

The PBPE has a crystallinity in the range of from at least 1 to 30 wt (a heat of fusion of at least 2 to less than 50 Joules/gram (J/g)). For example, the crystallinity can be from a lower limit of 1, 2.5, or 3, wt (respectively, at least 2, 4, or 5 J/g) to an upper limit of 30, 24, 15 or 7, wt (respectively, less than 50, 40, 24.8 or 11 J/g). For example, when the PBPE is propylene/ethylene copolymer, it may have a crystallinity in the range of from at least 1 to 24, 15, 7, or 5, wt % (respectively, at least 2 to less than 40, 24.8, 11, or 8.3 J/g). Crystallinity is measured via the DSC method described in WO 2014/100386.

The propylene/ethylene copolymer comprises units derived from propylene and polymeric units derived from ethylene comonomer and optional C4-C10 a-olefin. Exemplary comonomers are $C_2$, and $C_4$ to $C_{10}$ a-olefins; for example, $C_2$, $C_4$, $C_6$ and Cs a-olefins (ethylene is considered an a-olefin in this disclosure).

In an embodiment, the PBPE comprises from 1 to 40 wt % ethylene comonomer. For example, the comonomer content can be from a lower limit of 1, 3, 4, 5, 7 or 9, wt % to an upper limit of 40, 35, 30, 27, 20, 15, 12 or 9, wt %. For example, the propylene/ethylene copolymer comprises from 1 to 35 wt %, or, in alternative, from 1 to 30, 3 to 27, 3 to 20, or from 3 to 15, wt % of ethylene comonomer.

In an embodiment, the PBPE has a density from 0.8601 g/cm$^3$ or 0.8701 g/cm$^3$, to 0.9000 g/cm$^3$, or 0.8900 g/cm$^3$ measured in accordance with ISO 1183.

In an embodiment, the PBPE has a molecular weight distribution (MWD), defined as weight average molecular weight divided by number average molecular weight (Mw/Mn) of 3.5 or less; in the alternative 3.0 or less; or in another alternative from 1.8 to 3.0. Conventional gel permeation chromatography (GPC) measurements are used to determine Mw, Mn and Mw/Mn as described in WO 2014/100386.

Such PBPE types of polymers are further described in U.S. Pat. Nos. 6,960,635 and 6,525,157. Such PBPE is commercially available from The Dow Chemical Company, under the trademark VERSIFY, or from ExxonMobil Chemical Company, under the trademark VISTAMAXX.

In an embodiment, the PBPE is further characterized as comprising (A) between 60 and less than 100, between 80 and 99, or between 85 and 99, wt units derived from propylene, and (B) between greater than zero and 40, or between 1 and 20, 4 and 16, or between 4 and 15, wt units derived from ethylene and optionally one or more $C_{4-12}$ alpha-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

In an embodiment, the PBPE copolymer has a melt temperature (Tm) from 55° C. to 146° C. measured via the DSC method described in WO 2014/100386.

A nonlimiting example of a suitable propylene/ethylene copolymer is VERSIFY 2000 available from The Dow Chemical Company.

LDPE

In one embodiment the LDPE used in the practice of this invention has a melt index (MI) from 0.2 g/10 min, or 0.5 g/10 min to 10 g/10 min, or 20 g/10 min, or 50 g/10 min measured in accordance with ASTM 1238 (190° C./2.16 kg).

In one embodiment the LDPE has a specific gravity from 0.915 g/cm$^3$ to 0.925 g/cc, or 0.930 g/cm$^3$, 0.935 g/cm$^3$, or 0.940 g/cm$^3$ measured in accordance with ASTM D792.

In an embodiment, the LDPE is made in an autoclave high pressure polymerization process, a tubular high pressure polymerization process, or combinations thereof. In a further embodiment, the LDPE excludes linear low density polyethylene and high density polyethylene.

PBPE/LDPE Blend

In an embodiment the PBPE/LDPE blend includes from 30 wt % to 80 wt % of the PBPE and from 20 wt % to 70 wt % of the LDPE. Weight percent is based on total weight of the blend, i.e., PBPE, LDPE and any other blend components, e.g., additives.

In an embodiment, the PBPE/LDPE blend includes at least 50 wt %, or at least 60 wt %, or at least 70 wt % PBPE and less than 50 wt %, or less than 40 wt %, or less than 30 wt %, but at least 5 wt %, or at least 10 wt % or at least 20 wt % LDPE. The PBPE/LDPE blend further has a specific gravity from 0.890 g/cm$^3$ to 0.915 g/cm$^3$ measured in accordance with ASTM D792, and a melt index from 1.0 g/10 min to 2.0 g/10 min. measured in accordance with ASTM D1238 (190° C./2.16 kg).

In an embodiment, the PBPE/LDPE blend includes 75 wt % PBPE and 25 wt % LDPE. The 75/25 blend further has a specific gravity from 0.89 g/cm$^3$ to 0.90 g/cm$^3$, and a melt index from 3.0 g/10 min to 4.0 g/10. In a further embodiment, the 75/25 blend has a specific gravity of 0.895 g/cm$^3$ and a melt index of 3.8 g/10 min.

Intermediate Layer(s)

In one embodiment of the invention, the package can comprise one or more intermediate layers. These layers can serve any of various functions, e.g., as a tie between the exterior and interior layers, or as a tie between one or both of the exterior and interior layers and another intermediate layer; as a barrier layer to moisture and/or oxygen; as a means of providing physical strength to the package; etc., and these layers can comprise, consist essentially of, or consist of, of single sheet of film or of two or more sublayers. Examples of intermediate layers include, but are not limited to, barrier films such as ethylene vinyl alcohol (EVOH), polyvinylidene chloride (SARAN™ film), polyamides, aluminum foil, etc.; adhesive films or coatings such as PBPE, polyacrylates, polyethylene, adhesives (solvent-based, water-based and solventless), etc.

Layer Thickness

The thickness of the laminated film and the thickness of the various layers and sublayers (if any) of the laminated film can vary widely. Typically, the thickness of the laminated film, i.e., the film from which the package is formed, is from 0.3 to 6.0 mil (from 8 to 152 μm), more typically from 0.8 to 4.0 mil (from 20 to 100 μm), and even more typically from 1.0 to 3.0 mil (from 25 to 76 μm).

The thickness of the exterior layer is typically from 0.3 to 3.0 mil (from 8 to 76 μm), more typically from 0.4 to 2.0 mil (from 10 to 50 μm), and even more typically from 0.5 to 1.2 mil (from 12 to 30 μm).

The thickness of the interior layer is typically from 0.4 to 4 mil (from 10 to 100 μm), more typically from 0.5 to 3.0 mil (from 12 to 76 μm), and even more typically from 0.8 to 2.0 mil (from 20 to 50 μm).

The thickness of any individual intermediate layer is typically from 0.3 to 3.0 mil (from 8 to 76 μm), more typically from 0.4 to 2.0 mil (from 10 to 50 μm), and even more typically from 0.5 to 1.2 mil (from 12 to 30 μm).

The thickness of any particular sublayer of any particular layer will vary with, among other things, the composition and purpose of the sublayer.

Procedure for Forming the Laminated Film

Laminated film can be prepared either by extrusion coating/lamination or adhesive lamination.

Extrusion Coating/Lamination

Extrusion coating or lamination is a technique for producing packaging materials. Similar to cast film, extrusion coating is a flat die technique. A film can be extrusion coated onto a substrate either in the form of a monolayer or a coextruded extrudate according to, for example, the processes described in U.S. Pat. No. 4,339,507. Utilizing multiple extruders or by passing the various substrates through the extrusion coating system several times can result in multiple polymer layers each providing some sort of performance attribute whether it be barrier, toughness, or improved hot tack or heat sealability. Some typical end use applications for multi-layered/multi-substrate systems are for snack, dry food, liquid or cheese packages. Other end use applications include, but are not limited to, pet foods, snacks, chips, frozen foods, meats, hot dogs, and numerous other applications.

Adhesive Lamination

The following is illustrative of a procedure for forming an adhesive lamination. A known thickness (48 micron for instance) exterior film (lamination substrate) goes through a coating deck where a solvent-based (or solventless) or water-based adhesive is applied at 20-50% solids at a coat weight of about 0.5-3 pounds per ream. After the adhesive is applied, the web travels through an oven for drying (if necessary), then moves to a laminator comprising at least a heated steel roll and a rubber roll (other configurations may also exists). The back side of the coated exterior film makes contact with the hot steel roll. In the meantime the interior film is corona treated to about 38-42 dyne. The corona treated side of the film comes into contact with the adhesive side of the exterior substrate as it enters between the rubber roll and heated steel roll and the two substrates are combined. The resulting laminate structure is wound on a rewind system thus forming the final laminate.

Procedure for Forming a Package

Flexible films are used to form packaging to protect a given content. There are multiple ways of producing packages with flexible films. For example, Vertical Form Fill and Seal (VFFS) is a process where a flat sheet of flexible film is turned into a tube by a longitudinal seal (lap or fin seal) and then transformed into a pouch by (generally) top and bottom seals. In the VFFS process, the package is sealed on a vertical plane, followed by formation of the bottom and top horizontal seals. See Bilgen, M., Van Dun, J., *Insuring Seal Integrity and Broad Operating Window*, TAPPI, Place Conference (2012).

A Horizontal Form Fill and Seal (HFFS) packaging process is very similar to the VFFS process. The HFFS process involves package sealing by sliding on a horizontal plane in which package ends are cut from side to side.

Package Uses

Nonlimiting examples of contents suitable for containment by the packages of this invention include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

The following examples illustrate an embodiment of the invention.

EXAMPLES

Inventive Structure

The inventive structure consisted of the following layers:

(1) Exterior layer of transparent and reverse printed BOPP;

(2) Tie layer is a 3-sublayer co-extrusion coated web comprising a blend of:

(a) a first sublayer (30 wt %) consisting of 100% VERSIFY™ 2000, a propylene-ethylene copolymer (plastomer) with a density of 0.888 g/cm$^3$ (ISO 1183), MFR (230° C./2.16 kg) (ASTM D1238) of 2.0 g/10 min, and available from The Dow Chemical Company;

(b) a second sublayer (40 wt %) consisting of 100% DOWLEX™ 2035, a linear low density polyethylene with a specific gravity of 0.921 g/cm$^3$ (ASTM D792), MI (190° C./2.16 kg) (ASTM D1238) of 6.0 g/10 min, and available from The Dow Chemical Company; and (c) a third sublayer (30 wt %) consisting of 100% PRIMACOR™ 3440, an ethylene acrylic acid copolymer with a density of 0.938 g/cm$^3$ (ISO 1183), MFR (190° C./2.16 kg) (ASTM D1238) of 11.0 g/10 min, and available from The Dow Chemical Company;

(3) Metallized BOPP (4) 3-sublayer, co-extruded interior (sealant) layer consisting of:

(d) A first sublayer (27.5 wt %) consisting of 100% VERSIFY™ 2000;

(e) A second sublayer (27.5 wt %) consisting of 100% LDPE 722, a low density polyethylene with a specific gravity of 0.920 g/cm$^3$ (ASTM D792), MI (190° C./2.16 kg) (ASTM D1238) of 8.0 g/10 min, and available from The Dow Chemical Company; and (f) A third sublayer (45 wt %) consisting of 100% of a melt blended polyethylene resin of about 75% PBPE and about 25% of LDPE with a density of 0.895 g/cm$^3$ (ASTM D792), MI (190° C./2.16 kg) (ASTM D1238) of 3.80 g/10 min, or MFR (230° C./2.16 kg) (ASTM D1238) of 8.50 g/10 min.

The tie layer is applied to either or both of the transparent BOPP and metallized BOPP at a total rate of 16 pounds per ream.

The thickness of the:

Exterior layer is 1.2 mil (30 μm),
Tie layer is 16 lb/ream,
Metallized OPP layer is 0.7 mil (18 μm), and
Interior layer is 1.1 mil (28 μm).

The thickness of the sublayers of the interior layer is:

First sublayer (VERSIFY™ 2000)—0.3 mil (8 μm),
Second sublayer (LDPE 722)—0.3 mil (8 μm), and
Third sublayer (PBPE/LDPE blend)—0.5 mil (12 μm).

The layers of the inventive structure are arranged so that one (bottom) surface of the exterior layer is in contact with one (top) surface of the tie layer, and the other (bottom) surface of the tie layer is in contact with one (top) surface of the metallized OPP layer, and the other (bottom) surface of the metallized OPP layer is in contact with one (top) surface of the interior layer. The sublayers of the interior layer are arranged so that one (bottom) surface of the first sublayer is in contact with one (top) surface of the second sublayer, and the other (bottom) surface of the second sublayer is in contact with one (top) surface of the third sublayer. The top surface of the first sublayer is in contact with the bottom surface of the metallized OPP layer (VERSIFY™ 2000 plastomer adheres well to the OPP polymer). The bottom surface of the third sublayer (PBPE/LDPE blend) is also the bottom surface of the structure and as such, and it can form a peelable end seal. It can also join with the top surface of the exterior layer (OPP) to form a non-peelable lap seal.

Comparative Structure

The comparative structure consisted of the following layers:

(1) Exterior layer of OPP;

(2) Tie layer is a 3 sublayer co-extrusion coated web comprising a blend of:

(a) a first sublayer (30 wt %) consisting of 100% VERSIFY™ 2000, a propylene-ethylene copolymer (plastomer) with a with a density of 0.888 g/cm$^3$ (ISO 1183), MFR (230° C./2.16 kg) (ASTM D1238) of 2.0 g/10 min, and available from The Dow Chemical Company;

(b) a second sublayer (40 wt %) consisting of 100% DOWLEX™ 2035, a linear low density polyethylene with a specific gravity of 0.921 g/cm$^3$ (ASTM D792), MI (190° C./2.16 kg) (ASTM D1238) of 6.0 g/10 min, and available from The Dow Chemical Company; and (c) a third sublayer (30 wt %) consisting of 100% PRIMACOR™ 3440, an ethylene acrylic acid copolymer with a density of 0.938 g/cm$^3$ (ISO 1183), MFR (190° C./2.16 kg) (ASTM D1238) of 11.0 g/10 min, and available from The Dow Chemical Company (3) Metallized BOPP;

(4) 3-sublayer, co-extruded interior (sealant) layer consisting of:

(d) A first sublayer (27.5 wt %) consisting of 100% VERSIFY™ 2000;

(e) A second sublayer (27.5 wt %) consisting of 100% of a melt blended polyethylene resin of about 30% PBPE and about 70% of LDPE with a density of 0.9135 g/cm$^3$ (ASTM D792), MI (190° C./2.16 kg) (ASTM D1238) of 1.9 g/10 min; and (f) A third sublayer (45 wt %) consisting of 100% AFFINITY PT 1450G1, an ethylene-alpha-olefin copolymer with a specific gravity of 0.904 g/cm$^3$ (ASTM D792), MI (190° C./2.16 kg) (ASTM D1238) of 7.5.0 g/10 min, and available from The Dow Chemical Company.

The tie layer is applied to either or both of the transparent BOPP and metallized BOPP at a total rate of 16 pounds per ream The thickness of the:

Exterior layer is 1.2 mil (30 μm),

Tie layer is 16 lb/ream,

Metallized OPP layer is 0.7 mil (18 μm), and

Interior layer is 1.1 mil (28 μm).

The thickness of the sublayers of the interior layer is:

First sublayer (VERSIFY™ 2000)—0.3 mil (8 μm),

Second sublayer (XUS-56703.03)—0.3 mil (8 μm), and

Third sublayer (AFFINITY PT 1450G1)—0.5 mil (12 μm).

AFFINITY PT 1450G1 (third sublayer) is used to provide a non-peelable lap seal but it does not work as peelable end seal hence a different formulation was used in the second sublayer with the intention to provide a peel seal via delamination. This different formulation also provide melt strength for low neck-in extrusion performance.

The layers of the comparative structure are arranged so that one (bottom) surface of the exterior layer is in contact with one (top) surface of the tie layer, and the other (bottom) surface of the tie layer is in contact with one (top) surface of the metallized OPP layer, and the other (bottom) surface of the metallized OPP layer is in contact with one (top) surface of the interior layer. The sublayers of the interior layer are arranged so that one (bottom) surface of the first sublayer is in contact with one (top) surface of the second sublayer, and the other (bottom) surface of the second sublayer is in contact with one (top) surface of the third sublayer. The top surface of the first sublayer is in contact with the bottom surface of the metallized OPP layer (VERSIFY™ 2000 plastomer adheres well to OPP polymer). The bottom surface of the third sublayer (AFFINITY PT 1450G1) is also the bottom surface of the structure and as such, and it can join with the top surface of the exterior layer (OPP) to form a non-peelable lap seal. The comparative structure provides a non-peelable lap seal and a non-peelable end seal.

Preparation Method for Inventive and Comparative Structures

Extrusion coating/lamination is used to fabricate the inventive and comparative samples. The extrusion coating equipment included the following:

| |
|---|
| 3½" Black Clawson Model 435, 30:1, L/D extruder with 150 HP Eurotherm digital drive system. (BC # L-1946-00) |
| 2½" ER-WE-PA, (#2.-14228.00), 28:1 L/D extruder with 75 HP Eurotherm Drive System. |
| 2" ER-WE-PA, (#2.-14229.00), 28:1 L/D extruder with 40 HP Eurotherm Drive System. |
| Cloeren 3 layer feed block with AAA, AAB, BAA, BAB, CBA, BCB selector plugs. (Cl # 86-128-416, & # 95-1450) |
| Cloeren 30" EBR III internal deckle (Edge Bead Reduction) Die. (Cl # 95-1450) |
| Primary Unwind, Black Clawson (U-1946-00) dual position unwind with dancer roll tension control. |
| Black-Clawson coater-laminator, 30" Chill Roll, nip roll, backing roll, score slitter and shear slitter with 20 HP Eurotherm digital drive system. (BC # E-1946-00) |
| Auxiliary Unwind, Black Clawson Model # D-386360 single position with tension control. |
| Turret winder/roll changer, Black Clawson Model (1.45.021.112 winder) (1.44.015.527 roll changer)single direction, tension transmitter controlled with 75 HP Eurotherm digital drive system. |
| Black Clawson Integrator Supervisory Control System with touch screen (BC # E, L, U-1946-00) |
| Corona Pre-Treater Station, Enercon Model SS 2413 bare roll treater with ceramic covered electrodes, powered by 7.5 HP Eurotherm Drive System. (SN 7559-1) |
| Corona Post-Treater Station, Enercon Model 36460 ceramic roll treater with ceramic covered electrode, powered by 7.5 HP Eurotherm Drive System. (SN 1608D-5) |
| Precision Cutter, Edge Trim Chopper and Blower. |
| NDC 8000 TDI Measurement and Control System (Model 707189-1 A) |
| Process Control "Gravitrol" gravimetric feed hoppers. |
| Maguire 3 component batch blender. (Model MB 420) |
| Glenro, Inc. infrared pre-heater (Model # 80) to supply heat to substrate prior to coating. (SN 4532) |

Results and Discussion

Figure 4:
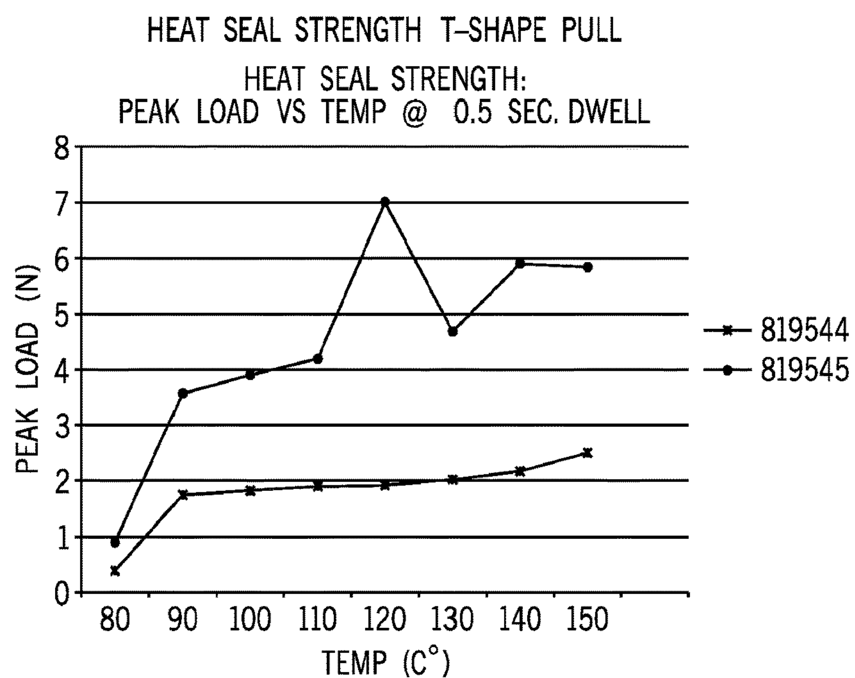
FIG. 4 is a graph reporting the T-shape pull heat seal strength of an inventive structure and a comparative structure.

T-Shape heat seal strength measurement (measured by pulling two ends of the seal at a 90° angle) is used to measure the peel force of the end seals on a pouch. Four pounds per inch or less is the desirable heat seal strength to assure easy peel functionality. Data provided in FIG. 4 shows that the inventive structure (819544) provides a peelable seal. On the other hand, the comparative structure (819545) is not peelable.

Figure 5:
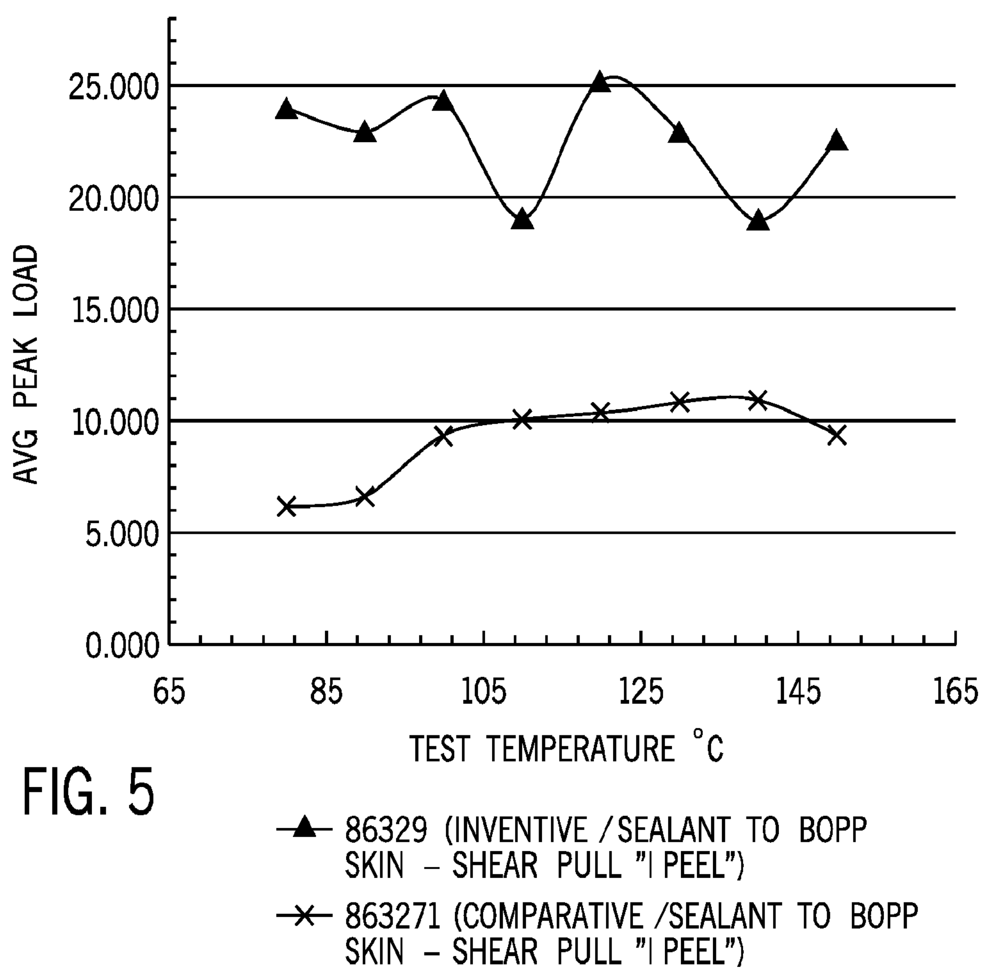
FIG. 5 is a graph reporting the I-shape pull heat seal strength of an inventive structure and a comparative structure.

I-Shape (overlap) heat seal strength measurement (measured by pulling two ends of the seal at a 180° angle) is used to measure the peel force of the lap seal on a pouch. Fifteen pounds per inch heat seal strength is desirable to assure good seal integrity. Data provided in FIG. 5 shows that the inventive structure (863269) provides greater than 15 lb/in lap seal strength. On the other hand, the comparative structure (863271) shows a peel strength of less than 15 lb/in.

What is claimed is:

1. A package comprising:

(A) an exterior surface comprising oriented-polypropylene (OPP), and (B) an interior surface comprising a PBPE/LDPE blend, in weight percent based on the weight of the blend, of:

(1) 75 wt % of a propylene-based plastomer or elastomer (PBPE), and (2) 25 wt % of low density polyethylene (LDPE), wherein the PBPE/LDPE blend has a density from 0.890 to 0.915 g/cm$^3$ measured in accordance with ASTM D792, and a melt index from 3.0 to 4.0 g/10 min measured in accordance with ASTM D-1238 (190° C./2.16 kg);

the package further comprising (C) a peelable end seal formed by joining in a heat seal two sections of the interior surface, the heat seal having a seal strength of 1 to 4 pounds per inch (lb/in) (4.48 to 17.9 Newton (N)/25.4 millimeter (mm)), and (D) a lap seal formed by joining in a heat seal a section of the interior surface with a section of the exterior surface, the heat seal having a seal strength of greater than or equal to (≥) 15 lb/in (67.2 N/25.4 mm).

2. The package of claim 1 in which the OPP is (i) mono-oriented cast polypropylene (cPP), or (ii) bi-oriented polypropylene (BOPP).

3. The package of claim 1 further comprising an exterior layer and an interior layer, and in which the exterior surface of the package is a surface of the exterior layer and the interior surface of the package is a surface of the interior layer.

4. The package of claim 1 in which the interior layer comprises at least two sublayers, and the interior surface of the package is a surface of one of the sublayers of the interior layer.

5. The package of claim 1 further comprising at least one intermediate layer.

6. The package of claim 1 in which the PBPE has a MFR from 0.1 to 25 g/10 min measured in accordance with ASTM D-1238 (230° C./2.16 Kg).

7. The package of claim 1 in which the PBPE has a crystallinity in the range from 1 to 30 wt % (a heat of fusion of at least 2 to less than 50 Joules/gram).

8. The package of claim 1 in which the PBPE comprises from 1 to 40 wt % mer units derived from ethylene.

9. The package of claim 1 in the form of a pouch.

10. The package of claim 1 further comprising at least one intermediate layer that is a tie layer.

11. The package of claim 1 in which the interior layer comprises three sublayers, and the interior surface of the package is a surface of one of the sublayers of the interior layer.

12. A package comprising:

(A) an exterior surface comprising oriented-polypropylene (OPP), and (B) an interior layer having an inner surface and comprising three sublayers, the sublayers comprising:

(a) a first sublayer comprising a propylene-based plastomer or elastomer (PBPE);

(b) a second sublayer comprising a polyolefin; and (c) a third sublayer comprising a PBPE/LDPE blend, in weight percent based on the weight of the blend, of (1) from 30 to 80 wt % of a propylene-based plastomer or elastomer (PBPE) and (2) from 20 to 70 wt % of low density polyethylene (LDPE), wherein the interior surface of the package is a surface of the third sublayer of the interior layer;

the package further comprising (C) a peelable end seal formed by joining in a heat seal two sections of the interior surface, the heat seal having a seal strength of 1 to 4 pounds per inch (lb/in) (4.48 to 17.9 Newton (N)/25.4 millimeter (mm)), and (D) a lap seal formed by joining in a heat seal a section of the interior surface with a section of the exterior surface, the heat seal having a seal strength of greater than or equal to (≥) 15 lb/in (67.2 N/25.4 mm).

13. The package of claim 12 in which the OPP is (i) mono-oriented cast polypropylene (cPP), or (ii) bi-oriented polypropylene (BOPP).

14. The package of claim 12 in which the PBPE/LDPE blend comprises:

(1) at least 50% of PBPE, and (2) less than 50% of LDPE.

15. The package of claim 12 in which the PBPE/LDPE blend has a density from 0.890 to 0.915 g/cm$^3$ measured in accordance with ASTM D792.

16. The package of claim 12 in which the PBPE has a melt flow rate from 0.1 to 25 g/10 min measured in accordance with ASTM D-1238.

17. The package of claim 12 in which the PBPE has a crystallinity in the range of 1 wt % to 30 wt %.

18. The package of claim 12 in which the PBPE comprises from 1 wt % to 40 wt % units derived from ethylene.

19. The package of claim 12 in the form of a pouch.

20. The package of claim 12 further comprising at least one intermediate layer that is a tie layer.

* * * * *